United States Patent
Onder

[11] 3,901,641
[45] Aug. 26, 1975

[54] COMPACTING STEP BY STEP

[75] Inventor: Harald Onder, Wetzikon, Switzerland

[73] Assignee: Swiss Aluminum Ltd., Neuhausen am Rheinfall, Switzerland

[22] Filed: July 5, 1973

[21] Appl. No.: 376,340

Related U.S. Application Data

[62] Division of Ser. No. 262,247, June 13, 1972, Pat. No. 3,876,744.

[30] Foreign Application Priority Data

June 24, 1971  Switzerland.................... 9231/71

[52] U.S. Cl. ............. 425/406; 264/109; 264/294; 425/79; 425/411; 425/461; 425/DIG. 29; 425/DIG. 28

[51] Int. Cl.² ......................................... B29C 3/00

[58] Field of Search ....... 425/193, 79, 192, 78, 224, 425/354, 466, 443, 461, DIG. 29, DIG. 30, 376, 338, 405 H, DIG. 28, 406; 264/29, 109, 120, 294, 296, 323

[56] References Cited

UNITED STATES PATENTS

| 1,534,826 | 4/1925  | Allison............................... 425/466 |
| 1,577,015 | 3/1926  | Glaze................................. 425/466 |
| 2,289,787 | 7/1942  | Kaschke et al. ................ 264/323 X |
| 2,578,229 | 12/1951 | Clement et al. ................ 425/466 X |
| 2,784,453 | 3/1957  | Hjulian ............................. 425/338 |
| 3,226,768 | 1/1966  | Zelewsky et al. .................... 425/461 |

FOREIGN PATENTS OR APPLICATIONS

2,021,412  11/1971  Germany ............................ 425/466

*Primary Examiner*—Robert L. Spicer, Jr.
*Attorney, Agent, or Firm*—Ernest F. Marmorek

[57]  ABSTRACT

A mold, for use in producing a continuous length of product, is divided longitudinally into at least four movable segments. The segments are movable synchronously inwardly and outwardly transversely to the mold axis, and are so shaped as to provide, in the axial direction, a tapering mold cavity followed by a cavity with walls substantially parallel to the axis.

6 Claims, 12 Drawing Figures

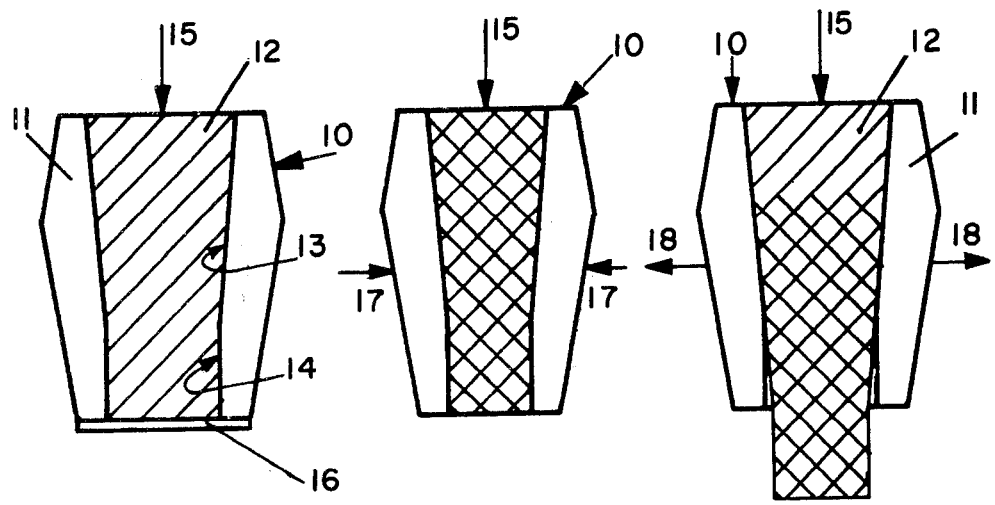
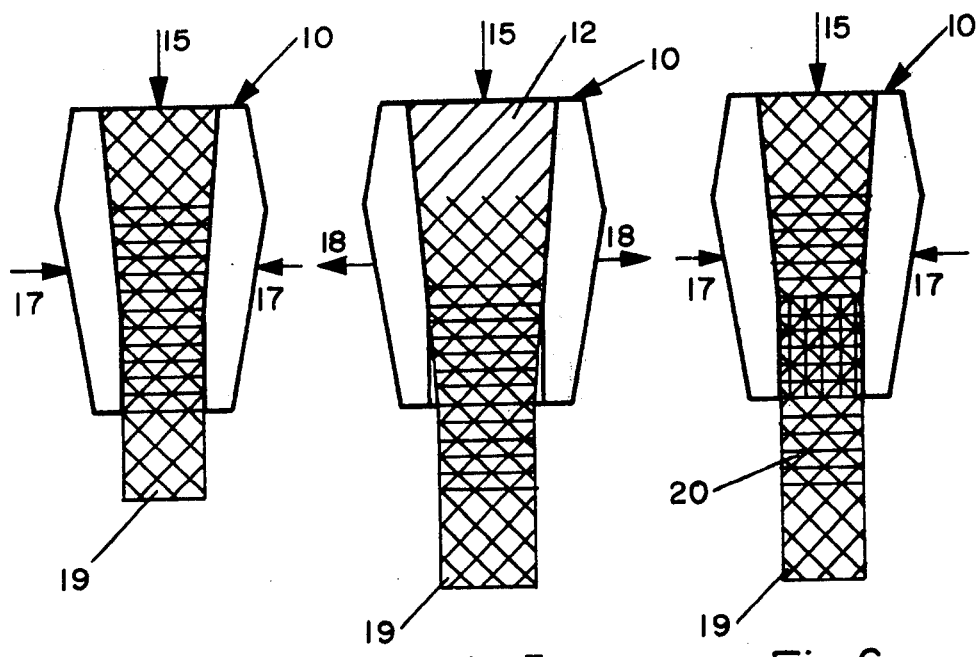
Fig.1  Fig.2  Fig.3
Fig.4  Fig.5  Fig.6

COMPACTING STEP BY STEP

This is a division of application Ser. No. 262,247, filed June 13, 1972, now U.S. Pat. No. 3,876,744.

BACKGROUND OF THE INVENTION

My present invention relates to the continuous production of a continuous length of product by compacting a composition consisting of small particles (that is granular or composed of short fibres) and a binding agent. In the field of refractory and related materials such moldings, which must satisfy high requirements, are molded with a minimum possible addition of binding agent or plasticiser in block presses. The addition of binding agent or plasticiser must be kept low so that no shrinkages or stresses occur in the subsequent firing. The block presses have the disadvantage that they work discontinuously. In the case of molding by extruders a higher addition of binding agent or plasticiser is necessary, so that the moldings obtained cannot satisfy any high requirements after firing.

These considerations are valid both in the production of hightemperature-resistant bricks, for example from quartz sand, fireclay or aluminium oxide, and in the manufacture of artificial carbon and graphite moldings.

In the production of aluminum by electrolysis of aluminum oxide in a fused fluoride bath, for example, artificial carbonaceous blocks are used as electrodes, for the production of which two main methods are known.

According to one main method the green artificial carbonaceous composition is pressed in a mold with the aid of a plunger or of two oppositely acting plungers (block pressing). The method offers the advantage that it is possible to work with a low addition of binding agent. However it has two disadvantages. Firstly it is not continuous and therefore does not fit well into the course of processing. Secondly the finished blocks have a very great anisotropy, which is attributable to the long compression distances. An inhomogeneous resistance of the fired (baked) electrodes against oxidiation results from the anisotropy.

According to the second main method the green artificial carbonaceous composition is processed in an extruder. The method is continuous and can be fitted well into the course of processing, but it is very expensive as regards the machines used and the composition requires substantially more binding agent than in block pressing. Further disadvantages derive from the very distinct radial anisotropy of the artificial carbonaceous blocks obtained. On the other hand the uniformity of the material quality over the length is advantageous.

The obtained artificial carbonaceous blocks are of course intended subsequently to be fired (baked).

SUMMARY OF THE INVENTION

The object of my invention is the combination of the advantages of both the main methods, that is block pressing and extrusion.

In accordance with my invention in a method of continuously producing a continuous length of product by compacting a composition consisting of small particles and a binding agent, the composition is introduced continuously into one end of an open ended mold and in passing through the mold, the composition is compacted step by step into a continuous length by lateral pressure.

This method, which is particularly applicable to the production of artificial carbonaceous products, is continuous and the requirement of binding agent or plasticiser is just as low as in the case of the conventional block pressing.

The composition is expediently introduced into a longitudinally divided mold the segments of which, in the axial direction of passage of the composition, firstly form a tapering mold cavity and then a cavity with walls parallel with the axis, the segments moving synchronously back and forth perpendicularly to the axis of the mold to produce the step by step compaction. At every movement of the mold segments apart the composition is moved forwards and at every movement together it is further compacted.

The composition is most advantageously introduced into the wider end of the mold by means of a compacting worm screw which is arranged axially of the mold. The filling pressure thus achieved is intended both to prevent the development of a force component in the direction against the material flow through the mold, so that the cross-sections in the continuous length remain even, and to effect the opening of the mold and thus the longitudinal movement of the continuous length.

The invention is directed to a mold for use in the method, the mold being open ended and longitudinally divided into at least four segments and of polyhedral internal cross-section, the segments being movable synchronously inwards and outwards transversely to the axis of the mold and being shaped to provide in the axial direction firstly a mold cavity tapering in the direction and then a cavity with walls parallel with the axis.

Preferably, the segments each provide one side of the polyhedron and are symmetrically arranged around the axis of the mold and abut one another across planes which are continuations of the sides of the polyhedron, the segments being movable linearly in guides substantially tangentially of the polyhedron.

A machine for carrying out the method will consist of such a mold together with a device for introducing the composition into the wider end of the mold.

DESCRIPTION OF THE DRAWINGS

A machine for carrying out the method is illustrated by way of example in the accompanying drawings, in which:

FIGS. 1 to 6 are vertical axial sections of a mold illustrating diagrammatically the steps in producing a continuous length of product from green synthetic carbon;

FIG. 1 shows the first phase in the commencement of operation. A mold 10 with its segments 11 is open and filled with green articicial carbonaceous composition 12. The mold has a tapering zone 13 and a zone 14 with walls parallel with the axis. The vertical arrow 15 indicates the axial filling pressure. The mold 10 is closed at the bottom by a floor 16 for starting operation. At this stage the green artificial carbonaceous composition has the same density in the entire mold cavity.

FIG. 2 shows the condition after the first compacting operation. The mold 10 has closed. The horizontal arrows 17 indicate the direction of movement of the mold segments. Compacting is indicated by the cross-hatching. The filling pressure 15, provided for example by a feed screw, has prevented material from moving back upwards.

FIG. 3 shows the condition after the re-opening of the mold 10, that is to say after the mold segments 11 have moved apart again (arrows 18). The floor 16 has been removed. The compacted composition has been moved downwards by the filling pressure 15 until the pressing rests upon the walls of the tapering mold cavity 13. Refilling has then been effected with further uncompacted artificial carbonaceous composition 12.

In FIG. 4 the mold 10 is closed again. The second compacting operation has taken place. Here again the filling pressure 15 has prevented material from moving back upwards. The twice-compacted artificial carbon composition is indicated by the cross-hatching and an additional horizontal hatching. The part 19 of the carbonaceous body which has emerged from the mold is only cross-hatched. It has been subjected to only one single compacting operation, and is waste from starting up operation.

In FIG. 5 the mold 10 has opened again and the artificial carbonaceous body has been moved downwards a second time by the filling pressure 15. A further quantity of uncompacted artificial carbonaceous composition 12 has been added.

FIG. 6 shows the condition after the third closure of the mold 10. The thrice-compacted composition is indicated by cross-hatching and additionally by horizontal and vertical hatching. In the case of the size ratios as sketched in the Figures this would be the usable final state of compacting; in this case only the lowermost part 19 of the carbonaceous body and the next following part 20 would be waste from starting operation.

The tool can have different dimensions and can achieve a final compacting for example only after closure of the mold 5 or 6 times or still more frequent closure, in which case that length of the carbonaceous body which comprises the insufficiently pressed parts is to be regarded as waste from starting operation.

The distinctive feature of the method as described with reference to FIGS. 1 to 6 consists in that the main proportion of the compacting is determined not by the magnitude of the tool movement but by the geometrical formation of the pressing tool (mold) itself. Thus it is possible to keep the amplitude of the mold movement small and correspondingly to increase the frequency of the reciprocating movement of the mold segments, so that finally one can speak of a vibrating movement. During the course of work a pressure gradient establishes itself in the mold which is dependent directly upon the geometrical form of the tool and the compression curve (density/pressure function) of the artificial carbonaceous mixture.

Figure 7:
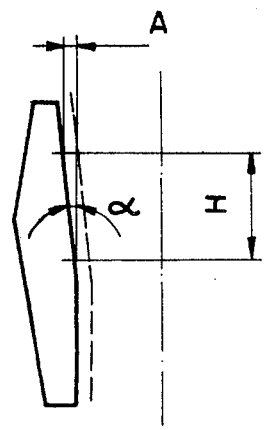
FIGS. 7 to 10 illustrate a mold having four segments.

FIG. 7 indicates the performance capacity of such an apparatus. $\alpha$ is the angle of inclination of the walls of the tapering part of the mold cavity, A is the amplitude of the horizontal reciprocating movement and H the axial movement of the carbon length (feed movement) at every opening of the mold. H corresponds to the value (A/tan $\alpha$).

By way of example the following values are assumed:

| | |
|---|---|
| $\alpha$ | 5° |
| f (frequency of horizontal movement) | 10 Hz |
| A | 0.5 mm. |
| H | 7 mm. |
| $\eta$ (efficiency in relation to H) | 50% |

On account of the adhesion friction of the artificial carbonaceous composition on the mold wall, an efficiency of only 50% is assumed. This produces an actual axial movement H' of the artificial carbonaceous length of H × $\eta$ = 2.85 mm. per oscillation (horizontal movement back and forth). In an operation with a frequency of f = 10 Hz, the artificial carbonaceous continuous length produced a length L is obtained which is equal to 2.85 · 10 · 3600 = 102.6 m. per hour. With a final cross-section of 500 × 500 mm. and an apparent density of 1.6 tons per cu. m. this would correspond to an hourly output of 41.04 tons.

In the example given the feed movement H per oscillation is relatively small. In order to achieve a composition compacting in the ration 2 : 1 the tapering part of the mold must have a length of about 1.200 mm. in the case of an artificial carbonaceous final cross-section of 500 × 500 mm. This has the result that the artificial carbonaceous composition has reached its final density of 1.6 t/cu.m. only after about 400 oscillations, and consequently that the length of waste from starting operation amounts to about 1.200 mm. plus the length of the mold part of constant cross-section (for example 250 mm.).

The most various artificial carbonaceous mixtures can be processed by the method according to the invention. An artificial carbonaceous mixture for the manufacture of anodes for aluminum fusion electrolysis has for example the following composition by weight:

| Petroleum coke grain size: | 3.36 to 8.0 mm. | 16.6% |
|---|---|---|
| | 1.68 to 3.36 mm. | 12.5% |
| | 0.84 to 1.68 mm. | 12.5% |
| | 0.42 to 0.84 mm. | 8.3% |
| | 0.21 to 0.42 mm. | 8.3% |
| | <0.21 mm. | 24.8% |
| Coal tar medium-hard pitch (binding agent) | | 17.0% |
| | | 100.0% |

In the processing of the green artificial carbonaceous composition according to the method in accordance with the invention (as also in block pressing and extruding) the binding agent must be plastic and therefore the entire composition must be warm. For this reason the composition is brought before processing to a temperature which is determined by the viscosity-temperature function of the binding agent. In the case of coal tar medium-hard pitch the requisite temperature lies between 125° and 175°C. The composition is introduced into the mold at such a temperature. It is advisable to keep the temperature of the mold approximately at the level of that of the introduced composition during operation.

In the production of the artificial carbonaceous composition in place of petroleum coke as dry material there can of course also be considered pitch coke or anthracite (the latter for the cathodes of aluminum electrolysis cells) and in place of coal tar medium-hard pitch any other cokable binding agent (such as petroleum pitch) may be considered. The dry material consists of amorphous carbon with a minimum of inorganic impurities (10% in the case of anthracite, 0.5% in the case of pitch or petroleum coke).

The mold of the illustrated machine has a polyhedral internal cross-section with at least four corners. It consists for example of steel.

Figure 8:
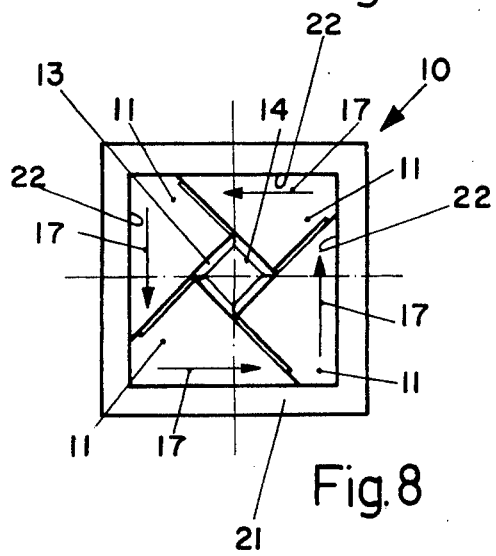

FIG. 8 shows a diagrammatic plan view of a mold 10 with four segments 11 which are tapered at 13 and have a constant cross-section with parallel walls at 14, namely in the open position, that is with segments drawn apart. The arrows 17 indicate the direction for the closing movement of the segments 11. The frame 21 contains the guides 22 for the movement of the segments 11 and takes up the deformation forces.

Figure 9:
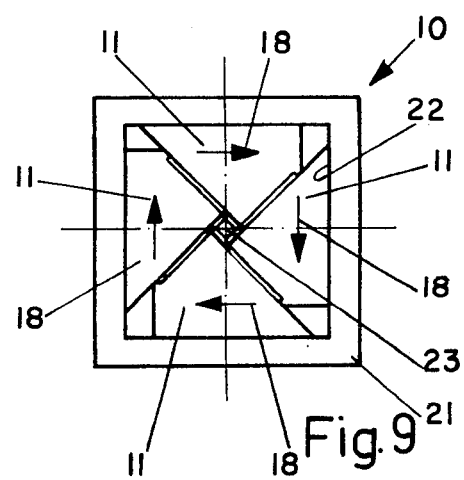

FIG. 9 shows diagrammatically the mold 10 with its segments 11 in the closed position. 23 indicates the free cross-section which the lower part of the mold 10 (the part with parallel walls) then has and thus determines the cross-section of the continuous length to be produced. The arrows 18 indicate the direction for the movement of the segments 11 apart.

Figure 10:
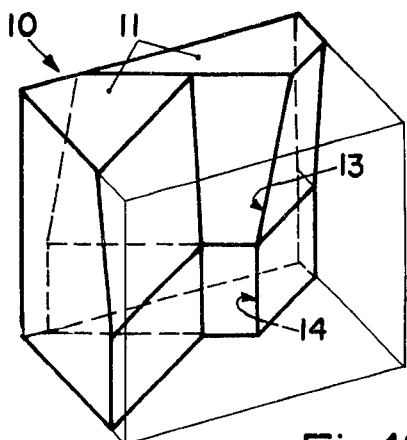

FIG. 10 shows in perspective, partially in dot-and-dash lines, one half of the mold of FIGS. 8 and 9, the frame 21 being omitted.

Figure 11:
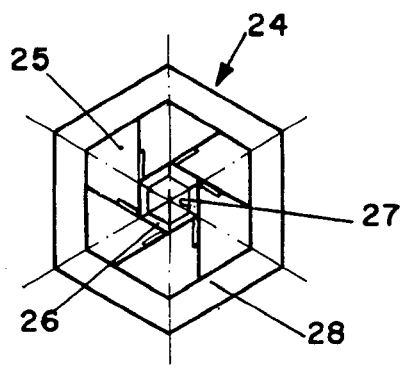
FIGS. 11 and 12 illustrate a mold having six segments.
Figure 12:
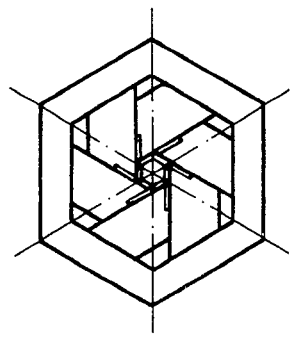

FIG. 11 shows diagrammatically in plan view a mold 24 with six segments 25 in the open position and FIG. 12 shows the same in the closed position. In perspective the segments appear approximately like those of FIG. 10. Each has a tapering part 26 and a part 27 which extends parallel with the axis of the mold on the mold cavity side and thus with the other segments produces a mold cavity having walls parallel with the axis. 28 designates the frame.

What I claim is:

1. An axially elongated mold for continuously producing a continuous length of product by step-by-step compacting a composition comprised of small particles and a binding agent, said mold being open ended, vertically arranged and longitudinally divided into a plurality of segments, said mold being of polygonal internal cross-section, moving means operable for synchronously moving all of said segments inwardly and outwardly in a direction transverse to the longitudinal axis of said mold, to produce the step-by-step compaction from more than two lateral directions, said segments, in combination, being shaped to form, in the downward axial compacting direction, a first tapered mold cavity and then a second mold cavity having walls parallel to the axis of said mold.

2. The mold according to claim 1 wherein there are four of said segments.

3. The mold according to claim 1 wherein there are six of said segments.

4. The mold according to claim 1 wherein said segments each provide one side of the polygon and are symmetrically arranged about the longitudinal axis of said mold, said segments being in abuttment with one another across planes which are continuous of the sides of the polygon, said segments being moveable in a direction substantially tangential to the sides of the polyhedron.

5. The mold according to claim 1 wherein a removable floor is provided for temporarily closing the end of said mold that is remote from the inlet end thereof, said floor being in position only during the starting of the filling operation of said mold.

6. The mold according to claim 1 wherein guide means are provided for limiting said segments to linear movement.

* * * * *